US009388299B2

(12) United States Patent
Hua

(10) Patent No.: US 9,388,299 B2
(45) Date of Patent: *Jul. 12, 2016

(54) ZIRCONIUM TREATED SODIUM ALUMINOSILICATES AND METHODS OF MAKING SAME

(71) Applicant: J. M. Huber Corporation, Atlanta, GA (US)

(72) Inventor: Duen-Wu Hua, Edgewood, MD (US)

(73) Assignee: J.M. Huber Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,816

(22) Filed: Apr. 28, 2015

(65) Prior Publication Data

US 2016/0122512 A1    May 5, 2016

Related U.S. Application Data

(63) Continuation of application No. 14/527,861, filed on Oct. 30, 2014, now Pat. No. 9,045,616.

(51) Int. Cl.
*C09D 1/00* (2006.01)
*C08K 9/02* (2006.01)
*C09D 125/14* (2006.01)

(52) U.S. Cl.
CPC ...... *C08K 9/02* (2013.01); *C09D 1/00* (2013.01)

(58) Field of Classification Search
CPC ........... C09D 1/00; C09D 125/14; C08K 9/02
See application file for complete search history.

(56) References Cited

U.S. PATENT DOCUMENTS

| 3,915,734 | A  | 10/1975 | Fitton |
| 3,963,512 | A  | 6/1976 | Swift et al. |
| 4,640,716 | A  | 2/1987 | Cleland |
| 4,812,299 | A  | 3/1989 | Wason |
| 4,863,796 | A  | 9/1989 | Wason |
| 5,106,420 | A  | 4/1992 | Marshall, Jr. |
| 5,112,402 | A  | 5/1992 | Freeman et al. |
| 5,186,746 | A  | 2/1993 | Freeman |
| 5,316,576 | A  | 5/1994 | Freeman |
| 5,591,256 | A  | 1/1997 | Freeman et al. |
| 5,814,143 | A  | 9/1998 | Freeman et al. |
| 9,045,616 | B1 | 6/2015 | Hua |

FOREIGN PATENT DOCUMENTS

EP    0206837    12/1986

OTHER PUBLICATIONS

European Search Report of Ep 15 16 3655, mailed 31 Mar. 2016, European Patent Office, 7 pp. 26057 Patent Trademark Office.

*Primary Examiner* — Pegah Parvini
(74) *Attorney, Agent, or Firm* — Merchant & Gould P.C.

(57) ABSTRACT

Aluminosilicate pigments enriched by zirconium treatment, and methods of making the pigments, are disclosed. Such zirconium-containing aluminosilicate pigments can have a unique combination of small particle size, high surface area, low oil absorption, and neutral pH. These pigments can be used in various paint and coating applications, such as a $TiO_2$ extender, offering improved properties to the finished paint or coating.

21 Claims, No Drawings

ZIRCONIUM TREATED SODIUM ALUMINOSILICATES AND METHODS OF MAKING SAME

REFERENCE TO RELATED APPLICATION

This application is a continuation application of U.S. patent application Ser. No. 14/527,861, filed on Oct. 30, 2014, now U.S. Pat. No. 9,045,616, the disclosure of which is incorporated herein by reference in its entirety.

BACKGROUND OF THE INVENTION

Synthetic amorphous sodium aluminosilicates have commonly been used in paints, coatings, and other applications as extender pigments. These pigments usually function to improve bulk and dry hiding, at reduced $TiO_2$ loadings. As compared to mineral extenders such as calcined clay, these synthetic aluminosilicate pigments have fewer impurities. These aluminosilicate pigments often rely on their high structure to provide better optical performance, and usually, the higher the structure, the better the performance. However, high structure pigments also can have higher absorption capacity, which can be detrimental due to high binder demand and loss of scrub resistance.

It would be beneficial to produce aluminosilicate-based pigments that address these and other needs, for example, to produce improved paints and coatings. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Zirconium-containing aluminosilicate pigment particles are disclosed and described herein. In accordance with various aspects of this invention, such zirconium-containing aluminosilicate pigment particles can comprise at least a partial coating of a zirconium compound on the surface of alkali metal aluminosilicate particles and/or alkaline earth metal-modified alkali metal aluminosilicate particles. Generally, the weight percentage of zirconium can be within a range from about 0.05 to about 4 wt. %, based on the weight of the zirconium-containing aluminosilicate pigment particles. These zirconium-containing aluminosilicate pigment particles, in particular aspects of this invention, can be characterized by (i) an average particle size in a range from about 3 to about 7 µm; (ii) a BET surface area in a range from about 70 to about 200 $m^2/g$; (iii) an oil absorption in a range from about 70 to about 120 cc/100 g; and (iv) a pH in a range from about 6 to about 7.8.

Processes for producing zirconium-containing aluminosilicate pigment particles also are disclosed and described herein. One such process for producing zirconium-containing aluminosilicate pigment particles can comprise contacting an aqueous slurry of alkali metal aluminosilicate particles and/or alkaline earth metal-modified alkali metal aluminosilicate particles with at least one of zirconium sulfate and zirconium oxysulfate under conditions sufficient for a zirconium compound to at least partially coat the alkali metal aluminosilicate particles and/or the alkaline earth metal-modified alkali metal aluminosilicate particles. Typically, the weight percentage of zirconium can fall within a range from about 0.05 to about 4 wt. %, based on the weight of the zirconium-containing aluminosilicate pigment particles (on a dry basis). In further aspects, the zirconium-containing aluminosilicate pigment particles can be characterized by (i) an average particle size in a range from about 3 to about 7 µm; (ii) a BET surface area in a range from about 70 to about 200 $m^2/g$; (iii) an oil absorption in a range from about 70 to about 120 cc/100 g; and (iv) a pH in a range from about 6 to about 7.8.

Various compositions containing the zirconium-containing aluminosilicate pigment particles also are encompassed herein, such as paint or coating formulations. Unexpectedly, the resultant paints or coatings can have improved opacity/contrast ratio, and/or improved tint strength, and/or improved brightness index, and/or improved scrub resistance.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a composition consistent with aspects of the present invention can comprise; alternatively, can consist essentially of; or alternatively, can consist of; (1) zirconium-containing aluminosilicate pigment particles, (2) a binder, and (3) a liquid.

The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, or otherwise contacted or combined in some other manner or by any other suitable method. The materials or components can be contacted together in any order, in any manner, and for any length of time, unless otherwise specified.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicant discloses several types of ranges in the present invention. When Applicant discloses or claims a range of any type, Applicant's intent is to disclose or claim individually each possible number that such a range could reasonably encompass, including end points of the range as well as any sub-ranges and combinations of sub-ranges encompassed therein. As a representative example, the BET surface area of the zirconium-containing aluminosilicate pigment particles can be in certain ranges in various aspects of this invention. By a disclosure that the BET surface area can be in a range from about 70 to about 200 $m^2/g$, Applicant intends to recite that the surface area can be any surface area within the range and, for example, can be equal to about 70, about 80, about 90, about 100, about 110, about 120, about 130, about 140, about 150, about 160, about 170, about 180, about 190, or about 200 $m^2/g$. Additionally, the surface area can be within any range from about 70 to about 200 $m^2/g$ (for example, from about 80 to about 190 $m^2/g$), and this also includes any combination of ranges between about 70 and about 200 $m^2/g$ (for example, the surface area can be in a range from 75 to about 100 $m^2/g$ or from about 110 to about 200 $m^2/g$). Likewise, all other ranges disclosed herein should be interpreted in a manner similar to this example.

DETAILED DESCRIPTION OF THE INVENTION

Disclosed herein are zirconium-containing aluminosilicate pigment particles, methods for producing zirconium-containing aluminosilicate pigment particles, and paints and coatings and other articles of manufacture using the zirconium-containing aluminosilicate pigment particles.

Unexpectedly, Applicant has found that the zirconium-containing aluminosilicate pigment particles, as disclosed and described herein, can result in paints or coatings or other articles of manufacture that have improved opacity/contrast ratio, and/or improved tint strength, and/or improved brightness index, and/or improved scrub resistance, amongst other beneficial attributes. Also unexpectedly, Applicant has found that these beneficial properties can be achieved by using zirconium-containing aluminosilicate pigment particles characterized by a small average particle size, a high surface area, a low oil absorption, and a neutral pH.

Zirconium-Containing Aluminosilicate Pigment Particles

Consistent with aspects of the present invention, zirconium-containing aluminosilicate pigment particles can comprise at least a partial coating of a zirconium compound on the surface of alkali metal aluminosilicate particles and/or alkaline earth metal-modified alkali metal aluminosilicate particles. Generally, the weight percentage of zirconium can be in a range from about 0.05 to about 4 wt. %, based on the weight of the zirconium-containing aluminosilicate pigment particles. Moreover, the zirconium-containing aluminosilicate pigment particles can have the following characteristics: (i) an average particle size in a range from about 3 to about 7 μm, (ii) a BET surface area in a range from about 70 to about 200 $m^2/g$, (iii) an oil absorption in a range from about 70 to about 120 cc/100 g, and (iv) a pH in a range from about 6 to about 7.8. In further aspects, zirconium-containing aluminosilicate pigment particles consistent with the present invention also can have any of the characteristics or properties provided below, and in any combination.

In one aspect, the zirconium-containing aluminosilicate pigment particles can have a relatively small average particle size. Often, the average particle size (d50) can fall within a range from about 3 to about 7 μm, such as, for instance, from about 3 to about 6.5, from about 3 to about 6, from about 3 to about 5.5, from about 3.2 to about 7, from about 3.2 to about 6.5, from about 3.2 to about 5.8, from about 3.5 to about 7, from about 3.5 to about 6.5, from about 3.5 to about 6, or from about 3.5 to about 5.5 μm, and the like. Other appropriate ranges for the average particle size are readily apparent from this disclosure.

In an aspect, the zirconium-containing aluminosilicate pigment particles can have a relatively high surface area. Often, the BET surface area can fall within a range from about 70 to about 200, from about 100 to about 200, or from about 125 to about 200 $m^2/g$. In further aspects, the BET surface area can be in a range from about 70 to about 190, from about 100 to about 190, from about 110 to about 190, from about 125 to about 200, or from about 125 to about 175 $m^2/g$, and the like. Other appropriate ranges for the BET surface area are readily apparent from this disclosure.

In an aspect, the zirconium-containing aluminosilicate pigment particles can have a relatively low oil absorption. For instance, the oil absorption can be in a range from about 70 to about 120 cc/100 g. Alternatively, the oil absorption can be in a range from about 70 to about 115 cc/100 g; alternatively, from about 70 to about 110 cc/100 g; alternatively, from about 80 to about 120 cc/100 g; alternatively, from about 80 to about 115 cc/100 g; alternatively, from about 80 to about 110 cc/100 g; or alternatively, from about 80 to about 105 cc/100 g. Other appropriate ranges for the oil absorption are readily apparent from this disclosure.

Additionally, the zirconium-containing aluminosilicate pigment particles can have a substantially neutral pH, for example, a pH typically in a range from about 6 to about 8. In one aspect, the pH can be in a range from about 6 to about 7.8, or from about 6 to about 7.6. In another aspect, the pH can be in a range from about 6.1 to about 7.8, or from about 6.1 to about 7.7. In yet another aspect, the pH can be in a range from about 6.2 to about 7.8, or from about 6.2 to about 7.6. In still another aspect, the pH can be in a range about 6.4 to about 7.8, or from about 6.5 to about 7.5. Other appropriate ranges for the pH are readily apparent from this disclosure.

As described herein, the zirconium-containing aluminosilicate pigment particles can comprise at least a partial coating of a zirconium compound on the surface of alkali metal aluminosilicate particles and/or alkaline earth metal-modified alkali metal aluminosilicate particles. Thus, all or any portion of the surface of the alkali metal aluminosilicate particles and/or the alkaline earth metal-modified alkali metal aluminosilicate particles can be coated with the zirconium compound. While not wishing to be bound by theory, Applicant believes that the zirconium compound may be, in some aspects, $ZrO_2$. Therefore, the zirconium-containing aluminosilicate pigment particles can comprise at least a partial coating of $ZrO_2$ on the surface of the alkali metal aluminosilicate particles and/or the alkaline earth metal-modified alkali metal aluminosilicate particles. Other forms of zirconium compounds or complexes containing oxygen may be present in addition to or alternatively to $ZrO_2$, such as ZrO and/or zirconium compounds or complexes that may contain oxygen and hydrogen atoms.

In accordance with the present invention, the zirconium compound (e.g., $ZrO_2$ or otherwise) can be present in the zirconium-containing aluminosilicate pigment particles at an amount within a range from about 0.05 to about 4 wt. % zirconium. For example, the weight percentage of zirconium can be in a range from about 0.1 to about 3 wt. % zirconium, from about 0.1 to about 2 wt. % zirconium, or from about 0.2 to about 3 wt. % zirconium. Yet, in particular aspects, the weight percentage of zirconium can be in a range from about 0.2 to about 1 wt. % zirconium, from about 0.2 to about 0.8 wt. % zirconium, from about 0.3 to about 1 wt. % zirconium, or from about 0.3 to about 0.8 wt. % zirconium, and the like. These weight percentages are based on the weight of the zirconium-containing aluminosilicate pigment particles. Other appropriate ranges for the weight percentage of zirconium are readily apparent from this disclosure.

The zirconium-containing aluminosilicate pigment particles, in one aspect, can comprise at least a partial coating of a zirconium compound on the surface of alkali metal aluminosilicate particles. The zirconium-containing aluminosilicate pigment particles, in another aspect, can comprise at least a partial coating of a zirconium compound on the surface of alkaline earth metal-modified alkali metal aluminosilicate particles. The zirconium-containing aluminosilicate pigment particles, in yet another aspect, can comprise at least a partial coating of a zirconium compound on the surface of alkali metal aluminosilicate particles and alkaline earth metal-modified alkali metal aluminosilicate particles. Thus, the zirconium-containing aluminosilicate pigment particles disclosed herein can comprise a mixture or combination of alkali metal aluminosilicate particles and alkaline earth metal-modified alkali metal aluminosilicate particles that are at least partially coated with the zirconium compound.

In one aspect, the zirconium-containing aluminosilicate pigment particles can comprise zirconium-containing sodium aluminosilicate pigment particles, and the alkali metal aluminosilicate particles can comprise sodium aluminosilicate particles. In another aspect, the zirconium-containing aluminosilicate pigment particles can comprise zirconium-containing sodium magnesium aluminosilicate pigment particles, and the alkaline earth metal-modified alkali metal aluminosilicate particles can comprise sodium magnesium aluminosilicate particles. In these and other aspects, the alkali metal aluminosilicate particles and/or alkaline earth metal-modified alkali metal aluminosilicate particles can be amorphous, can be synthetic, or can be both amorphous and synthetic.

Additionally, the alkali metal aluminosilicate particles (and/or alkaline earth metal-modified alkali metal aluminosilicate particles) can have a relatively small average particle size. Often, the average particle size (d50) can fall within a range from about 3 to about 7 µm, such as, for instance, from about 3 to about 6.5, from about 3 to about 6, from about 3 to about 5.5, from about 3.2 to about 7, from about 3.2 to about 6.5, from about 3.2 to about 5.8, from about 3.5 to about 7, from about 3.5 to about 6.5, from about 3.5 to about 6, or from about 3.5 to about 5.5 µm, and the like. Other appropriate ranges for the average particle size of these aluminosilicate particles are readily apparent from this disclosure.

Additionally, the alkali metal aluminosilicate particles (and/or alkaline earth metal-modified alkali metal aluminosilicate particles) can have a relatively high surface area. Often, the BET surface area can fall within a range from about 70 to about 200, from about 100 to about 200, or from about 125 to about 200 $m^2/g$. In further aspects, the BET surface area can be in a range from about 75 to about 200, from about 80 to about 190, from about 80 to about 175, from about 80 to about 200, or from about 125 to about 175 $m^2/g$, and the like. Other appropriate ranges for the BET surface area of these aluminosilicate particles are readily apparent from this disclosure.

Additionally, the alkali metal aluminosilicate particles (and/or alkaline earth metal-modified alkali metal aluminosilicate particles) can have a relatively low oil absorption. For instance, the oil absorption can be in a range from about 60 to about 120 cc/100 g. Alternatively, the oil absorption can be in a range from about 70 to about 120 cc/100 g; alternatively, from about 70 to about 115 cc/100 g; alternatively, from about 80 to about 120 cc/100 g; alternatively, from about 80 to about 115 cc/100 g; alternatively, from about 80 to about 110 cc/100 g; or alternatively, from about 80 to about 105 cc/100 g. Other appropriate ranges for the oil absorption of these aluminosilicate particles are readily apparent from this disclosure.

Additionally, the alkali metal aluminosilicate particles (and/or alkaline earth metal-modified alkali metal aluminosilicate particles) can have a substantially neutral pH, for example, a pH typically in a range from about 6 to about 8. In one aspect, the pH can be in a range from about 6 to about 7.8, or from about 6 to about 7.6. In another aspect, the pH can be in a range from about 6.1 to about 7.8, or from about 6.1 to about 7.7. In yet another aspect, the pH can be in a range from about 6.2 to about 7.8, or from about 6.2 to about 7.6. In still another aspect, the pH can be in a range about 6.4 to about 7.8, or from about 6.5 to about 7.5. Other appropriate ranges for the pH of these aluminosilicate particles are readily apparent from this disclosure.

Processes for Preparing Zirconium-Containing Aluminosilicate Pigment Particles

Processes for producing zirconium-containing aluminosilicate pigment particles are disclosed and described herein. Such processes to produce zirconium-containing aluminosilicate pigment particles can comprise contacting an aqueous slurry of alkali metal aluminosilicate particles and/or alkaline earth metal-modified alkali metal aluminosilicate particles with at least one of zirconium sulfate and zirconium oxysulfate under conditions sufficient for a zirconium compound to at least partially coat the alkali metal aluminosilicate particles and/or alkaline earth metal-modified alkali metal aluminosilicate particles.

Generally, the features of the processes (e.g., the characteristics of the zirconium-containing aluminosilicate pigment particles, the characteristics of the alkali metal aluminosilicate particles and alkaline earth metal-modified alkali metal aluminosilicate particles, the use of zirconium sulfate and/or zirconium oxysulfate, the features of the aqueous slurry, the conditions under which the materials are contacted and the zirconium-containing aluminosilicate pigment particles are formed, among others) are independently described herein and these features can be combined in any combination to further describe the disclosed processes. For example, the weight percentage of zirconium can be in any range disclosed herein (e.g., from about 0.05 to about 4 wt. %, from about 0.3 to about 1 wt. %, etc.), based on the weight of the zirconium-containing aluminosilicate pigment particles, on a dry basis. Moreover, the zirconium-containing aluminosilicate pigment particles can be characterized by any average particle size disclosed herein (e.g., from about 3 to about 7 µm, from about 3 to about 6 µm, etc.), any BET surface area disclosed herein (e.g., from about 70 to about 200 $m^2/g$, from about 100 to about 200 $m^2/g$, etc.), any oil absorption disclosed herein (e.g., from about 70 to about 120 cc/100 g, from about 80 to about 110 cc/100 g, etc.), and any pH disclosed herein (e.g., from about 6 to about 7.8, from about 6.2 to about 7.6, etc.).

Moreover, other process steps can be conducted before, during, and/or after any of the steps listed in the disclosed processes, unless stated otherwise. Additionally, zirconium-containing aluminosilicate pigment particles produced in accordance with any of the disclosed processes are within the scope of this disclosure and are encompassed herein.

In accordance with one aspect of the present invention, the aqueous slurry of alkali metal aluminosilicate particles (and/or alkaline earth metal-modified alkali metal aluminosilicate particles) can be contacted with zirconium sulfate ($ZrSO_4$). In accordance with another aspect of the present invention, the aqueous slurry can be contacted with zirconium oxysulfate ($ZrOSO_4$). In accordance with yet another aspect of the present invention, the aqueous slurry can be contacted with a mixture or combination of zirconium sulfate ($ZrSO_4$) and zirconium oxysulfate ($ZrOSO_4$).

In a further aspect, the aqueous slurry can be contacted with liquid zirconium sulfate and/or liquid zirconium oxysulfate, i.e., the zirconium sulfate and/or zirconium oxysulfate are present in the liquid phase, for example, as a solution. Alternatively, the aqueous slurry can be contacted with dry zirconium sulfate (in solid form, such as a free-flowing powder). Alternatively, the aqueous slurry can be contacted with dry zirconium oxysulfate (in solid form, such as a free-flowing powder). Alternatively, the aqueous slurry can be contacted with a mixture or combination of dry zirconium sulfate and dry zirconium oxysulfate. Other suitable procedures for contacting the aqueous slurry with the zirconium sulfate and/or zirconium oxysulfate are readily apparent from this disclosure.

The aqueous slurry of alkali metal aluminosilicate particles and/or alkaline earth metal-modified alkali metal aluminosilicate particles is not limited to any particular pH range. However, consistent with particular aspects disclosed herein, the pH of the aqueous slurry of the alkali metal aluminosilicate particles and/or alkaline earth metal-modified alkali metal aluminosilicate particles can be a substantially neutral pH, for example, a pH typically in a range from about 6 to about 8. In one aspect, the pH can be in a range from about 6 to about 7.8, or from about 6 to about 7.6. In another aspect, the pH can be in a range from about 6.1 to about 7.8, or from about 6.1 to about 7.7. In yet another aspect, the pH can be in a range from about 6.2 to about 7.8, or from about 6.2 to about 7.6. In still another aspect, the pH can be in a range about 6.4 to about 7.8, or from about 6.5 to about 7.5. Other appropriate ranges for the pH of the aqueous slurry of the alkali metal aluminosilicate particles and/or alkaline earth metal-modified alkali metal aluminosilicate particles are readily apparent from this disclosure.

Generally, the pH decreases after contacting the aqueous slurry (of the alkali metal aluminosilicate particles and/or alkaline earth metal-modified alkali metal aluminosilicate particles) with at least one of zirconium sulfate and zirconium oxysulfate. Often, the pH after contacting the aqueous slurry with at least one of zirconium sulfate and zirconium oxysulfate can fall within a range from about 5.7 to about 7.7, from about 5.7 to about 7.6, from about 5.7 to about 7.5, from about 5.7 to about 7.4. In further aspects, the pH can be in a range from about 5.8 to about 7.7, from about 5.8 to about 7.5, from about 6 to about 7.7, from about 6 to about 7.6, or from about 6 to about 7.4, and the like. Other appropriate ranges for the pH after contacting the aqueous slurry with at least one of zirconium sulfate and zirconium oxysulfate are readily apparent from this disclosure.

The percent solids of the aqueous slurry are not limited to any particular range. However, the amount of the alkali metal aluminosilicate particles and/or alkaline earth metal-modified alkali metal aluminosilicate particles, in total, in the aqueous slurry generally falls within a range from about 1 to about 50 wt. %. In some aspects, the weight percent solids can be in a range from about 10 to about 40 wt. %, or from about 15 to about 40 wt. %. In other aspects, it can be beneficial to have a higher solids content of the alkali metal aluminosilicate particles and/or alkaline earth metal-modified alkali metal aluminosilicate particles, in total, in the aqueous slurry, and in these aspects, the percent solids generally falls within a range from about 20 to about 45 wt. %, from about 25 to about 40 wt. %, or from about 30 to about 40 wt. %, and the like. Other appropriate ranges for the weight percentage of particles in the aqueous slurry are readily apparent from this disclosure.

The processes disclosed herein can comprise contacting an aqueous slurry of alkali metal aluminosilicate particles and/or alkaline earth metal-modified alkali metal aluminosilicate particles with at least one of zirconium sulfate and zirconium oxysulfate under conditions sufficient for a zirconium compound to at least partially coat the alkali metal aluminosilicate particles and/or alkaline earth metal-modified alkali metal aluminosilicate particles. This process can be conducted in any suitable apparatus, such as container or vessel with a mixing device, or a stirred tank. The aqueous slurry can be contacted with at least one of zirconium sulfate and zirconium oxysulfate at a variety of temperatures and time periods. For instance, the temperature can be in a range from about 10° C. to about 80° C.; alternatively, from about 10° C. to about 70° C.; alternatively, from about 10° C. to about 60° C.; alternatively, from about 20° C. to about 80° C.; alternatively, from about 20° C. to about 60° C.; alternatively, from about 20° C. to about 50° C.; or alternatively, from about 25° C. to about 75° C. In these and other aspects, these temperature ranges also are meant to encompass circumstances where the process is conducted at a series of different temperatures (e.g., an initial temperature, a final temperature), instead of at a single fixed temperature, falling within the respective ranges. For instance, the aqueous slurry can be contacted initially with at least one of zirconium sulfate and zirconium oxysulfate at a lower temperature, and subsequently, the temperature can be increased to a higher, final temperature. The duration of the step of contacting the aqueous slurry with at least one of zirconium sulfate and zirconium oxysulfate is not limited to any particular period of time. Hence, this step can be conducted, for example, in a time period ranging from as little as 15-30 seconds to as long as 24-48 hours, or more. The appropriate contacting time can depend upon, for example, the initial/final temperature, the time required to ensure coating uniformity or homogeneity, the desired particle size, and the percent solids in the aqueous slurry, among other variables. Generally, however, the contacting step can be conducted in a time period that can be in a range from about 15 sec to about 48 hr, such as, for example, from about 1 min to about 24 hr, from about 30 sec to about 8 hr, from about 15 min to about 6 hr, from about 1 min to about 2 hr, or from about 30 min to about 2 hr. Other conditions sufficient for conducting the processes described herein are readily apparent from this disclosure.

In aspects of this invention, alkali metal aluminosilicate particles (and/or alkaline earth metal-modified alkali metal aluminosilicate particles) are at least partially coated (e.g., all or any portion of the surface) with a zirconium compound, and typically, the resultant weight percentage of zirconium can fall within a range from about 0.05 to about 4 wt. %, or from about 0.3 to about 1 wt. %, based on the final weight of the zirconium-containing aluminosilicate pigment particles, on a dry basis. Hence, some of the particles can have a small amount of the surface coated (e.g., less than 25%), while other particles may be completely coated (100% of the surface coated) with the zirconium compound. As one of skill in the art would readily recognize, it is desirable to have uniform particle coating and, therefore, homogeneous zirconium-containing aluminosilicate pigment particles. However, given the large number of pre-coated aluminosilicate particles and their respective particle size distribution and surface area (amongst other attributes), as well as contacting/mixing variations, there will inevitably be a variation in the amount of the coating on the respective particles, i.e., some particles will have a larger amount of the coating than other particles.

In certain aspects of this invention, the processes to produce zirconium-containing aluminosilicate pigment particles can further comprise a step of wet milling the particles after contacting the aqueous slurry with at least one of zirconium sulfate and zirconium oxysulfate. A bead milling process can be employed, although the wet milling step is not limited thereto. Beneficially, this wet milling step can improve pigment particle homogeneity and can be used to control or reduce particle size (e.g., to an average particle size of less than about 7 µm, or less than about 6 µm).

Additionally or alternatively, the processes to produce zirconium-containing aluminosilicate pigment particles can further comprise a step of drying the particles after contacting the aqueous slurry with at least one of zirconium sulfate and zirconium oxysulfate. A spray drying process can be employed, although the drying step is not limited thereto.

Additionally or alternatively, the processes to produce zirconium-containing aluminosilicate pigment particles can further comprise a step of dry milling the particles after contacting the aqueous slurry with at least one of zirconium sulfate and zirconium oxysulfate. A hammer milling process can be employed, although the dry milling step is not limited thereto.

Accordingly, Applicant contemplates that the processes to produce zirconium-containing aluminosilicate pigment particles can further comprise a step of wet milling, and/or a step of drying, and/or a step of dry milling the particles after contacting the aqueous slurry with at least one of zirconium sulfate and zirconium oxysulfate. Any one or more of these additional steps can be utilized, and in any suitable order. For example, the processes to produce zirconium-containing aluminosilicate pigment particles can further comprise a step of drying, followed by a step of dry milling. As another example, the processes to produce zirconium-containing aluminosilicate pigment particles can further comprise a step of wet milling, followed by a step of drying.

Compositions and Articles Using Zirconium-Containing Aluminosilicate Pigment Particles This invention is also directed to, and encompasses, any compositions, formulations, and articles of manufacture that contain any of the zirconium-containing aluminosilicate pigment particles disclosed herein (and their respective characteristics or features, such as average particle size, surface area, oil absorption, and pH), or any of the zirconium-containing aluminosilicate pigment particles (and their respective characteristics or features) produced by any of the processes disclosed herein.

Thus, a composition in one aspect of this invention can comprise a liquid and the zirconium-containing aluminosilicate pigment particles disclosed herein. This "liquid" can be any compound which, as a pure compound, is a liquid (not a solid or gas) at standard temperature (25° C.) and pressure (1 atm). Liquids also may be referred to herein as diluents. Water is an illustrative liquid or diluent contemplated herein, as are many organic solvents (e.g., aliphatic hydrocarbons, aromatic hydrocarbons, etc.), as would be recognized by those of skill in the art.

In another aspect, a paint or coating composition (often may be referred to as a paint or coating formulation) is provided, and in this aspect, the composition can comprise a binder (often may be referred to as a vehicle; examples include polymers such as acrylics, vinyl acrylics, styrene acrylics, etc.), a liquid (e.g., water or an organic solvent), and the zirconium-containing aluminosilicate pigment particles disclosed herein. Optionally, various additives can be present in the paint or coating formulations or compositions, dependent upon the desired properties. These additives can include, but are not limited to, catalysts, thickeners, plasticizers, fillers, fibers, colorants, dispersing agents, flow modifiers, surface modifiers, antioxidants or stabilizers, and the like, as well as combinations thereof. Hence, a paint or coating composition in yet another aspect of this invention can comprise a binder, a liquid, a colorant, and the zirconium-containing aluminosilicate pigment particles disclosed herein.

Also encompassed herein are paints or coatings (e.g., after drying or curing to form solid films or layers) produced from compositions (e.g., wet compositions) containing the zirconium-containing aluminosilicate pigment particles disclosed herein. The paints or coatings in accordance with the present invention typically can have a thickness between about 1 and about 500 µm, depending upon the end-use application, the targeted substrate, the expected environmental conditions, and so forth. For example, the paint or coating can have a thickness in a range from about 5 to about 300 µm, from about 25 to about 250 µm, or from about 35 to about 200 µm.

Also encompassed herein are articles of manufacture, which can comprise a substrate at least partially covered with the paint or coating, e.g., produced from any of the compositions containing any of the zirconium-containing aluminosilicate pigment particles disclosed herein. Accordingly, coated substrates that comprise a substrate at least partially covered with the paints or coatings described herein are also within the scope of this invention. Generally, substrates that can be employed in this invention can comprise metal, concrete, wood, paper, or plastic, as well as combinations thereof.

This invention also discloses methods of painting or coating a substrate, or producing a painted or coated substrate. One such method can comprise (a) providing a paint or coating composition comprising a binder, a liquid (e.g., water), and the zirconium-containing aluminosilicate pigment particles disclosed herein; (b) applying the paint or coating composition to a surface of the substrate; and (c) drying or curing the paint or coating composition onto the surface of the substrate, thereby producing a painted or coated substrate. Paint or coating compositions or formulations can be applied to the substrate by a variety of techniques, including, for example, dipping, rolling, brushing, spraying, squeeging, backrolling, pouring, troweling, and the like. Combinations of these techniques also can be used. The paint or coating composition can be used on both interior and exterior surfaces of substrates, if desired.

In an aspect, and unexpectedly, the resultant paints or coatings—resulting from drying or curing the paint or coating formulations containing the zirconium-containing aluminosilicate pigment particles disclosed herein—can have improved opacity/contrast ratio, and/or improved tint strength, and/or improved brightness index, and/or improved scrub resistance. Such improvements are illustrated in the examples that follow hereinbelow. In some aspects, the paint or coating can have a contrast ratio greater than or equal to about 96. Additionally or alternatively, the paint or coating can have a tint strength greater than or equal to about 99, or greater than or equal to about 99.5, or greater than or equal to about 100. Additionally or alternatively, the paint or coating can have a brightness index greater than or equal to about 89, or greater than or equal to about 91. Additionally or alternatively, the paint or coating can have a scrub resistance greater than or equal to about 800 cycles, or greater than or equal to about 850 cycles, or greater than or equal to about 900 cycles. Other appropriate ranges for the contrast ratio, tint strength, brightness index, and scrub resistance are readily apparent from this disclosure.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The average particle size, or d50 or median particle size, refers to the particle size for which 50% of the sample has a smaller size and 50% of the sample has a larger size. Average particle size was determined via the laser diffraction method using a Horiba LA 300 instrument.

The BET surface areas disclosed herein were determined in accordance with the BET nitrogen adsorption method of Brunaur et al., J. Am. Chem. Soc., 60, 309 (1938), which is well known to those of skill in the art.

Oil absorption values were determined in accordance with the rub-out method described in ASTM D281 using linseed oil (cc oil absorbed per 100 g of the particles). Generally, a higher oil absorption level indicates a higher structure particle, while a lower value typically indicates a lower structure particle.

The pH values disclosed herein (20% pH) were determined in an aqueous system containing 20 wt. % solids in deionized water using a pH meter.

Scrub Resistance (cycles to failure) was determined in accordance with ASTM D2486. Contrast Ratio was determined on 150 μm (wet) drawdowns of the paint formulation on panels, dried overnight in a dust-free environment. Using a Spectrophotometer (model SS 5100R, Premier Colorscan Instrument Pvt Ltd), the Y reflectance of the paint-coated black side and the Y reflectance of the paint-coated light side were measured, and the ratio of black to light was the Contrast Ratio. Tint Strength was determined on 150 μm (wet) drawdowns of the paint formulation on panels, dried overnight in a dust-free environment. Both an experimental sample and a control paint were tested. The tint strength of the experimental sample relative to the control paint was determined by measuring the relative reflectances of the respective drawdown samples using a Spectrophotometer. Brightness index was determined in accordance with ISO 2470.

Examples 1-24

The sodium aluminosilicate of Example 1 was prepared as follows. Approximately 300 L of hot process water and 12.4 kg of anhydrous sodium sulfate were added to a 1200-L reactor. While mixing, the reactor contents were heated to 55° C., and 5.9 L of sodium silicate were added to the reactor and mixed. A 25-min simultaneous addition step with alum and silicate solution followed, using a sodium silicate addition rate of 19.9 L/min and an alum addition rate of 7.26 L/min. After the simultaneous addition step, a reduced alum flow rate (1-2 L/min) was used to bring the batch pH to about 5.3. After digesting the batch for 10 min, the product slurry was washed and filtered using a press filter. The filtered cake was collected. A portion of filtered cake was spray dried and hammer milled to an average 5-6 micron particle size.

For Examples 2-3, a second portion of the filtered cake was reslurried in a small tank, and zirconium basic sulfate powder (Star Earth Minerals, $Zr_5O_8(SO_4)_2 \cdot xH_2O$) was added to result in a final amount of 0.3 wt. % Zr (Example 2) and 0.6 wt. % Zr (Example 3), based on the Zr-treated sodium aluminosilicate weight. The treated cake slurries were then spray dried and hammer milled to an average 5-6 micron particle size.

For Examples 4-5, a third portion of the filtered cake was reslurried in a small tank, and zirconium oxysulfate powder (Star Earth Minerals, $ZrOSO_4$) was added to result in a final amount of 0.3 wt. % Zr (Example 4) and 0.6 wt. % Zr (Example 5), based on the Zr-treated sodium aluminosilicate weight. The treated cake slurries were then spray dried and hammer milled to an average 5-6 micron particle size.

Table I summarizes certain properties and characteristics of the Zr-treated aluminosilicates of Examples 1-5. The Zr-treated aluminosilicate particles of Examples 4-5 had an average particle size in the 5-6 μm range, a BET surface area in the 130-140 $m^2$/g range, an oil absorption in the 90-110 cc/100 g range, and a pH in the 6.4-7.0 range.

Examples 1-5 were compared to several synthetic amorphous sodium aluminosilicates typically used in paint applications, and commercially-available from J.M. Huber Corporation or Evonik Industries: C1 had an oil absorption of 108 cc/100 g, C2 had an oil absorption of 133 cc/100 g, C3 had an oil absorption of 90 cc/100 g, and C4 had an oil absorption of 118 cc/100 g. Table II lists the standard 60 PVC (pigment volume concentration) model (control) paint formulation used to evaluate the various aluminosilicates and Zr-treated aluminosilicates, by replacing 10% or 15% of the $TiO_2$ pigment, and Table III summarizes certain paint properties of Examples 6-24 at a 150 μm wet film thickness. Unexpectedly, Table III demonstrates that Examples 13-16 (utilizing the aluminosilicate pigments treated with zirconium oxysulfate of Examples 4-5) outperformed the other examples in optical performance, as reflected by improvements in contrast ratio, brightness, and tinting strength.

TABLE I

Examples 1-5.

| | Examples | | | | |
|---|---|---|---|---|---|
| | 1 | 2 | 3 | 4 | 5 |
| % Moisture | 6.44 | 6.17 | 5.72 | 4.55 | 4.23 |
| 20% pH | 7.38 | 7.48 | 7.43 | 6.98 | 6.48 |
| % $Na_2SO_4$ | 0.32 | 0.2 | 0.23 | 0.51 | 1.09 |
| % 325# Residue | 0.012 | 0.015 | 0.04 | 0.05 | 0.02 |
| Oil Absorption (cc/100 g) | 113.8 | 105.1 | 106.2 | 101.7 | 99.2 |
| Brabender Water Absorption | 134.1 | 129.6 | 127.6 | 126.0 | 126.1 |
| BET Surface Area ($m^2$/g) | 160.4 | 146.0 | 148.1 | 137.4 | 133.2 |
| Pour Density (g/100 cc) | 14.6 | 16.1 | 14.9 | 16.7 | 16.3 |
| Pack Density (g/100 cc) | 17.4 | 20.2 | 18.9 | 21.1 | 20.9 |
| Particle Size (μm) d50 | 5.24 | 5.21 | 5.50 | 5.41 | 5.43 |
| ISO Brightness | 96.88 | 97.82 | 98.05 | 97.80 | 97.94 |

TABLE II

Paint Formulation.

| Ingredients | Material Description | Wt. % |
| --- | --- | --- |
| Soft Water | | 16.00 |
| Sodium Hexa Meta Phosphate | Surfactant | 0.20 |
| Biocel SP 85 | Biocide | 0.20 |
| Mono Ethylene Glycol | | 3.00 |
| Napco NDW | Defoamer | 0.20 |
| Pine Oil | | 0.50 |
| Natrosol HBR 250 | Thickener | 0.48 |
| Liquor Ammonia | | 0.10 |
| Indofil 850 (Anionic) | Dispersant | 0.80 |
| Hydroxide 9.5 (Nonionic) | Dispersant | 0.50 |
| $TiO_2$ (DuPont Ti Pure R+ 902) | $TiO_2$ pigment | 15.00 |
| Calcite GM104 | $CaCO_3$ | 10.00 |
| HD Supratek 90 | Clay | 10.00 |
| Talcum GM404 | Talc | 5.00 |
| Liquor Ammonia | | 0.10 |
| Texanol | | 1.00 |
| Styrene Acrylic Emulsion 50% Solids | Binder | 20.00 |
| Soft Water | | 16.92 |
| Total | | 100.00 |

TABLE III

Examples 6-24.

| Example | Aluminosilicate Pigment | $TiO_2$ Replacement | Contrast Ratio | Brightness | Tinting Strength |
| --- | --- | --- | --- | --- | --- |
| 6 | Control paint | 0% | 95.90 | 89.207 | 100.00 |
| 7 | Example 1 | 10% | 96.30 | 88.851 | 99.22 |
| 8 | Example 1 | 15% | 96.37 | 88.857 | 98.50 |
| 9 | Example 2 | 10% | 96.12 | 89.064 | 98.56 |
| 10 | Example 2 | 15% | 96.25 | 88.875 | 98.23 |
| 11 | Example 3 | 10% | 96.25 | 89.575 | 99.29 |
| 12 | Example 3 | 15% | 96.18 | 89.464 | 98.28 |
| 13 | Example 4 | 10% | 96.14 | 89.343 | 100.75 |
| 14 | Example 4 | 15% | 96.47 | 89.649 | 100.46 |
| 15 | Example 5 | 10% | 96.12 | 89.806 | 100.52 |
| 16 | Example 5 | 15% | 96.46 | 89.636 | 100.11 |
| 17 | C1 | 10% | 96.34 | 89.312 | 100.04 |
| 18 | C1 | 15% | 96.43 | 89.454 | 99.00 |
| 19 | C2 | 10% | 96.15 | 89.084 | 100.47 |
| 20 | C2 | 15% | 96.28 | 89.532 | 99.36 |
| 21 | C3 | 10% | 95.93 | 88.872 | 98.67 |
| 22 | C3 | 15% | 96.15 | 88.804 | 97.81 |
| 23 | C4 | 10% | 96.30 | 89.603 | 100.80 |
| 24 | C4 | 15% | 96.44 | 89.779 | 99.71 |

Examples 25-43

Sodium aluminosilicate was prepared as follows. Approximately 5990 L of sulfate water (4% concentration) were added to a 36,000-L reactor. While mixing, the reactor contents were heated to 55° C., and 119.8 L of sodium silicate were added to the reactor and mixed. A 25-min simultaneous addition step with alum and silicate solution followed, using a sodium silicate addition rate of 398.8 L/min and an alum addition rate of 145.1 L/min. After the simultaneous addition step, a reduced alum flow rate was used to bring the batch pH to about 5.3. After digesting the batch for 10 min, the product slurry was washed and filtered using a press filter. The collected filtered cake was reslurried and zirconium oxysulfate powder was manually added. The zirconium treated cake slurry was then fed into a vertical bead mill. The bead-milled Zr-treated cake slurry was then spray dried and hammer milled to an average 3-5 micron particle size. Two batches were run, one resulting in a final amount of 0.3 wt. % Zr (Example 25), and the other resulting in a final amount of 0.45 wt. % Zr (Example 26), based on the Zr-treated sodium aluminosilicate weight.

Table IV summarizes certain properties and characteristics of the Zr-treated aluminosilicates of Examples 25-26 and the commercially-available aluminosilicates of Examples 27-30 from J.M. Huber Corporation, Evonik Industries, or IQE Group (Example 27 was aluminosilicate C1, Example 28 was aluminosilicate C2, Example 29 was aluminosilicate C4, and Example 30 was aluminosilicate C5, having an oil absorption of 124 cc/100 g). The Zr-treated aluminosilicate particles of Examples 25-26 had an average particle size in the 3.5-4 μm range, a BET surface area in the 180-190 $m^2/g$ range, an oil absorption in the 90-100 cc/100 g range, and a pH in the 6.5-7.0 range.

The pigments of Examples 25-30 were evaluated in the standard 60 PVC model (control) paint formulation shown in Table II above, by replacing 10% or 15% of the $TiO_2$ pigment, and Table V summarizes certain paint properties of Examples 31-43 at a 150 μm wet film thickness. Unexpectedly, Table IV and Table V demonstrate that Examples 32-35 (utilizing the aluminosilicate pigments treated with zirconium oxysulfate of Examples 25-26) provided the highest surface area, lowest oil absorption, neutral pH, and the best overall combination of contrast ratio, brightness, tinting strength, and scrub resistance.

TABLE IV

Examples 25-30.

| Examples | 25 | 26 | 27 | 28 | 29 | 30 |
| --- | --- | --- | --- | --- | --- | --- |
| % Moisture | 4.92 | 4.96 | 4.63 | 4.41 | 6.64 | 6.48 |
| 20% pH | 6.86 | 6.65 | 6.61 | 10.3 | 9.77 | 10.02 |
| % $Na_2SO_4$ | 0.59 | 0.79 | 4.01 | 0.85 | 0.82 | 0.58 |
| % 325 Mesh Residue | 0.03 | 0.02 | 0.03 | 0.03 | Nil | Nil |
| Oil Absorption (cc/100 g) | 94 | 97 | 108 | 133 | 118 | 124 |
| Water Absorption | 111.5 | 115 | 125.1 | 155.5 | 144.9 | 149.9 |
| Brabender Technydine Brightness | 98.1 | 97.7 | 98.2 | 97.3 | 97.0 | 98.1 |
| BET Surface Area ($m^2/g$) | 185.9 | 187.5 | 105.4 | 91.6 | 58.2 | 48.6 |
| Particle Size d50 (um) | 3.82 | 3.79 | 4.33 | 5.84 | 5.73 | 5.16 |
| Pour Density (g/100 cc) | 17.7 | 18.5 | 18.4 | 15.8 | 18.5 | 19.3 |
| Pack Density (g/100 cc) | 22.8 | 23.9 | 24.5 | 20.9 | 25.7 | 26.7 |

TABLE V

Examples 31-43.

| Example | Aluminosilicate Pigment | % TiO2 Replacement | Contrast Ratio | Brightness Index | Tinting Strength | Scrub Resistance Test | Viscosity Brookfield (cP) | Stormer Viscosity (KU) | 60° Gloss Head | 85° Gloss Head |
|---|---|---|---|---|---|---|---|---|---|---|
| 31 | Control | 0% | 96.25 | 91.345 | 100.00 | 905 | 3080 | 83 | 2.2 | 2.7 |
| 32 | Example 25 | 10% | 96.35 | 91.401 | 99.75 | 940 | 3000 | 82 | 2.2 | 2.7 |
| 33 | Example 25 | 15% | 96.50 | 91.517 | 99.38 | 860 | 3120 | 83 | 2.2 | 2.8 |
| 34 | Example 26 | 10% | 96.48 | 91.584 | 100.65 | 915 | 3400 | 84 | 2.2 | 2.9 |
| 35 | Example 26 | 15% | 96.67 | 91.564 | 100.05 | 850 | 3500 | 85 | 2.2 | 2.9 |
| 36 | C1 | 10% | 96.33 | 91.383 | 99.81 | 845 | 3340 | 83 | 2.1 | 2.8 |
| 37 | C1 | 15% | 96.45 | 91.451 | 99.01 | 790 | 3200 | 82 | 2.2 | 2.7 |
| 38 | C2 | 10% | 96.40 | 91.414 | 100.27 | 796 | 3660 | 85 | 2.1 | 2.7 |
| 39 | C2 | 15% | 96.65 | 91.676 | 99.93 | 725 | 3700 | 85 | 2.2 | 2.8 |
| 40 | C4 | 10% | 96.36 | 91.384 | 100.15 | 825 | 3340 | 83 | 2.2 | 2.7 |
| 41 | C4 | 15% | 96.58 | 91.465 | 99.34 | 765 | 3300 | 83 | 2.2 | 2.6 |
| 42 | C5 | 10% | 96.44 | 91.410 | 100.85 | 810 | 3360 | 83 | 2.2 | 2.7 |
| 43 | C5 | 15% | 96.80 | 91.514 | 100.35 | 743 | 3420 | 84 | 2.2 | 2.8 |

Examples 44-46

The sodium aluminosilicate of Example 44 was prepared as follows. Approximately 300 L of hot process water and 12.4 kg of anhydrous sodium sulfate were added to a 1200-L reactor. While mixing, the reactor contents were heated to 55° C., and 5.9 L of sodium silicate were added to the reactor and mixed. A 25-min simultaneous addition step with alum and silicate solution followed, using a sodium silicate addition rate of 19.9 L/min and an alum addition rate of 7.26 L/min. After the simultaneous addition step, a reduced alum flow rate (1-2 L/min) was used to bring the batch pH to about 5.3. After digesting the batch for 10 min, the product slurry was washed and filtered using a press filter. The filtered cake was collected. A portion of filtered cake was spray dried and hammer milled to an average 5-6 micron particle size.

For Examples 45-46, a second portion of the filtered cake was reslurried in a small tank, and zirconium oxychloride solution (Sigma-Aldrich, $ZrOCl_2$, 20% active in concentrated HCl) was added to result in a final amount of 0.037 wt. % Zr (Example 45) and 0.15 wt. % Zr (Example 46), based on the Zr-treated sodium aluminosilicate weight. The treated cake slurries were then spray dried and hammer milled to an average 5-6.5 micron particle size.

The pigments of Examples 44-46 were evaluated in a standard acrylic flat test formulation at a 56 PVC (pigment volume concentration) by replacing 10% of the $TiO_2$ pigment. Table VI summarizes certain properties of Examples 44-46 and the tint strength (at a 5-mil wet film thickness) and contrast ratio (calculated at a 2-mil thickness). As shown in Table VI, an increased Zr loading in the pigment generated only slight increases in tinting strength. However, the sample pH decreased significantly with increasing Zr content (see Examples 45 and 46), due to the addition of the zirconium oxychloride. A tint strength of 100 or more could not be reached without a higher loading of Zr, which resulted in an unsuitable pH of less than 6, which is too acidic for many paint and coating applications. Moreover, the higher Zr loading of Example 46 resulted in a salt content of over 5%.

TABLE VI

Examples 44-46.

| | Examples | | |
|---|---|---|---|
| | 44 | 45 | 46 |
| % Moisture | 5.70 | 5.40 | 6.40 |
| % 325 Mesh Residue | 0.03 | <0.01 | 0.01 |
| AbC (H2O corrected) | 144.8 | 136.7 | 132.6 |
| BET Surface Area (m2/g) | 210 | 199 | 150 |
| CTAB Surface Area (m2/g) | 85 | 86 | 90 |
| Pack Density (lb/ft3) | 17.8 | 17.8 | 18.9 |
| Pour Density (lb/ft3) | 7.8 | 7.8 | 8.3 |
| Mean Particle Size (um) | 6.23 | 6.65 | 5.81 |
| Median Particle Size (um) | 5.85 | 6.18 | 5.5 |
| Na2SO4 + NaCl | 0.58% | <0.44% | 5.47% |
| Oil Absorption (cc/100 g) | 111 | 115 | 111 |
| 20% pH | 7.45 | 7.56 | 6.35 |
| Technydine Brightness | 99.9 | 100.6 | 100.6 |
| Tint Strength | 99.14 | 99.18 | 99.42 |
| Contrast Ratio | 94.65 | 94.54 | 94.54 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. Zirconium-containing aluminosilicate pigment particles comprising:

at least a partial coating of a zirconium compound on the surface of alkali metal aluminosilicate particles and/or alkaline earth metal-modified alkali metal aluminosilicate particles, wherein the weight percentage of zirconium is in a range from about 0.05 to about 4 wt. %, based on the weight of the zirconium-containing aluminosilicate pigment particles; and wherein the zirconium-containing aluminosilicate pigment particles are characterized by:

(i) an average particle size in a range from about 3 to about 7 μm;
(ii) a BET surface area in a range from about 70 to about 200 m²/g;
(iii) an oil absorption in a range from about 70 to about 120 cc/100 g; and
(iv) a pH in a range from about 6 to about 7.8.

Embodiment 2. A process to produce zirconium-containing aluminosilicate pigment particles, the process comprising:
contacting an aqueous slurry of alkali metal aluminosilicate particles and/or alkaline earth metal-modified alkali metal aluminosilicate particles with at least one of zirconium sulfate and zirconium oxysulfate under conditions sufficient for a zirconium compound to at least partially coat the alkali metal aluminosilicate particles and/or the alkaline earth metal-modified alkali metal aluminosilicate particles;
wherein the weight percentage of zirconium is in a range from about 0.05 to about 4 wt. %, based on the weight of the zirconium-containing aluminosilicate pigment particles (on a dry basis): and
wherein the zirconium-containing aluminosilicate pigment particles are characterized by:
(i) an average particle size in a range from about 3 to about 7 μm;
(ii) a BET surface area in a range from about 70 to about 200 m²/g;
(iii) an oil absorption in a range from about 70 to about 120 cc/100 g; and
(iv) a pH in a range from about 6 to about 7.8.

Embodiment 3. The process or pigment particles defined in embodiment 1 or 2, wherein the weight percentage of zirconium is in any range of weight percentages disclosed herein, e.g., from about 0.1 to about 2 wt. % zirconium, from about 0.2 to about 3 wt. % zirconium, from about 0.2 to about 1 wt. % zirconium, from about 0.3 to about 0.8 wt. % zirconium, etc., based on the weight of the zirconium-containing aluminosilicate pigment particles.

Embodiment 4. The process or pigment particles defined in any one of the preceding embodiments, wherein the average particle size is in any range of average particles sizes disclosed herein, e.g., from about 3 to about 6.5, from about 3 to about 6, from about 3.2 to about 5.8, from about 3 to about 5.5 μm, etc.

Embodiment 5. The process or pigment particles defined in any one of the preceding embodiments, wherein the BET surface area is in any range of surface areas disclosed herein, e.g., from about 100 to about 200, from about 125 to about 200, from about 125 to about 175 m²/g, etc.

Embodiment 6. The process or pigment particles defined in any one of the preceding embodiments, wherein the oil absorption is an any range of oil absorption values disclosed herein, e.g., from about 70 to about 115, from about 80 to about 110, from about 80 to about 105 cc/100 g, etc.

Embodiment 7. The process or pigment particles defined in any one of the preceding embodiments, wherein the pH is in any range of pH values disclosed herein, e.g., from about 6.1 to about 7.7, from about 6.2 to about 7.8, from about 6.4 to about 7.8, from about 6.5 to about 7.5, etc.

Embodiment 8. The process or pigment particles defined in any one of embodiments 1-7, wherein the zirconium-containing aluminosilicate pigment particles comprise zirconium-containing sodium aluminosilicate pigment particles, and the alkali metal aluminosilicate particles comprise sodium aluminosilicate particles.

Embodiment 9. The process or pigment particles defined in any one of embodiments 1-7, wherein the zirconium-containing aluminosilicate pigment particles comprise zirconium-containing sodium magnesium aluminosilicate pigment particles, and the alkaline earth metal-modified alkali metal aluminosilicate particles comprise sodium magnesium aluminosilicate particles.

Embodiment 10. The process or pigment particles defined in any one of the preceding embodiments, wherein the alkali metal aluminosilicate particles and/or alkaline earth metal-modified alkali metal aluminosilicate particles are amorphous.

Embodiment 11. The process or pigment particles defined in any one of the preceding embodiments, wherein the alkali metal aluminosilicate particles and/or alkaline earth metal-modified alkali metal aluminosilicate particles are synthetic.

Embodiment 12. The process or pigment particles defined in any one of the preceding embodiments, wherein the alkali metal aluminosilicate particles and/or alkaline earth metal-modified alkali metal aluminosilicate particles are characterized by an average particle size in any range disclosed herein, e.g., from about 3 to about 6, from about 3 to about 5.8, from about 3.2 to about 5.8, from about 3.5 to about 5.5 μm, etc.

Embodiment 13. The process or pigment particles defined in any one of the preceding embodiments, wherein the alkali metal aluminosilicate particles and/or alkaline earth metal-modified alkali metal aluminosilicate particles are characterized by a BET surface area in any range disclosed herein, e.g., from about 75 to about 200, from about 80 to about 175, from about 80 to about 150 m²/g, etc.

Embodiment 14. The process or pigment particles defined in any one of the preceding embodiments, wherein the alkali metal aluminosilicate particles and/or alkaline earth metal-modified alkali metal aluminosilicate particles are characterized by an oil absorption in any range disclosed herein, e.g., from about 60 to about 120, from about 70 to about 115, from about 80 to about 105 cc/100 g, etc.

Embodiment 15. The process or pigment particles defined in any one of the preceding embodiments, wherein the alkali metal aluminosilicate particles and/or alkaline earth metal-modified alkali metal aluminosilicate particles are characterized by a pH in any range disclosed herein, e.g., from about 6 to about 7.8, from about 6.2 to about 7.8, from about 6.4 to about 7.8, from about 6.5 to about 7.5, etc.

Embodiment 16. The process defined in any one of embodiments 2-15, wherein the aqueous slurry is contacted with zirconium sulfate ($ZrSO_4$).

Embodiment 17. The process defined in embodiment 16, wherein the aqueous slurry is contacted with dry zirconium sulfate (e.g., a solid, a powder).

Embodiment 18. The process defined in any one of embodiments 2-15, wherein the aqueous slurry is contacted with zirconium oxysulfate ($ZrOSO_4$).

Embodiment 19. The process defined in embodiment 18, wherein the aqueous slurry is contacted with dry zirconium oxysulfate (e.g., a solid, a powder).

Embodiment 20. The process defined in any one of embodiments 2-19, wherein the pH of the aqueous slurry of the alkali metal aluminosilicate particles and/or alkaline earth metal-modified alkali metal aluminosilicate particles is in any range of pH values for the aqueous slurry disclosed herein, e.g., from about 6 to about 7.8, from about 6.2 to about 7.8, from about 6.4 to about 7.8, from about 6.5 to about 7.5, etc.

Embodiment 21. The process defined in any one of embodiments 2-20, wherein the pH after contacting the aqueous slurry with at least one of zirconium sulfate and zirconium oxysulfate is in any range of pH values disclosed herein, e.g., from about 5.7 to about 7.7, from about 5.7 to about 7.6, from about 5.8 to about 7.5, from about 6 to about 7.4, etc.

Embodiment 22. The process defined in any one of embodiments 2-21, wherein the conditions sufficient for the zirconium compound to at least partially coat the alkali metal aluminosilicate particles and/or alkaline earth metal-modified alkali metal aluminosilicate particles comprise any suitable temperature and time period, or any temperature and time period disclosed herein, e.g., from about 10° C. to about 80° C., from about 20° C. to about 60° C., from about 15 sec to about 48 hr, from about 30 sec to about 8 hr, from about 1 min to about 2 hr, etc.

Embodiment 23. The process defined in any one of embodiments 2-22, further comprising a step of wet milling after contacting the aqueous slurry with at least one of zirconium sulfate and zirconium oxysulfate, using any suitable technique or any technique disclosed herein, e.g., bead milling, etc.

Embodiment 24. The process defined in any one of embodiments 2-23, further comprising a step of drying after contacting the aqueous slurry with at least one of zirconium sulfate and zirconium oxysulfate, using any suitable technique or any technique disclosed herein, e.g., spray drying, etc.

Embodiment 25. The process defined in any one of embodiments 2-24, further comprising a step of dry milling after contacting the aqueous slurry with at least one of zirconium sulfate and zirconium oxysulfate, using any suitable technique or any technique disclosed herein, e.g., hammer milling, etc.

Embodiment 26. The process defined in any one of embodiments 2-25, wherein the amount of the alkali metal aluminosilicate particles and/or alkaline earth metal-modified alkali metal aluminosilicate particles (in total) in the aqueous slurry is in any range disclosed herein, e.g., from about 1 to about 50 wt. %, from about 10 to about 40 wt. %, from about 30 wt. % to about 40 wt. %, etc.

Embodiment 27. Zirconium-containing aluminosilicate pigment particles produced by the process defined in any one of embodiments 2-26.

Embodiment 28. A composition comprising a liquid (or diluent) and the pigment particles defined in any one of embodiments 1-15 and 27.

Embodiment 29. A paint composition or coating composition (or formulation) comprising a binder, a liquid, and the pigment particles defined in any one of embodiments 1-15 and 27.

Embodiment 30. A paint or coating (dry or solid) produced from the composition defined in embodiment 29.

Embodiment 31. An article of manufacture comprising a substrate at least partially covered with the paint or coating defined in embodiment 30, wherein the substrate comprises any suitable substrate or any substrate disclosed herein, e.g., metal, concrete, wood, paper, plastic, etc., or combinations thereof.

Embodiment 32. The paint or coating or article defined in embodiment 30 or 31, wherein the paint or coating has improved opacity/contrast ratio, and/or improved tint strength, and/or improved brightness index, and/or improved scrub resistance.

Embodiment 33. The paint or coating or article defined in any one of embodiments 30-32, wherein the paint or coating has a contrast ratio greater than or equal to about 96, and/or a tint strength greater than or equal to about 99 (or about 99.5, or about 100), and/or a brightness index greater than or equal to about 89 (or about 91), and/or a scrub resistance greater than or equal to about 800 cycles (or about 850, or about 900).

I claim:

1. Zirconium-containing aluminosilicate pigment particles comprising:
   at least a partial coating of a zirconium compound on the surface of alkali metal aluminosilicate particles and/or alkaline earth metal-modified alkali metal aluminosilicate particles, wherein the weight percentage of zirconium is in a range from about 0.1 to about 2 wt. %, based on the weight of the zirconium-containing aluminosilicate pigment particles; and
   wherein the zirconium-containing aluminosilicate pigment particles are characterized by:
   (i) an average particle size in a range from about 3 to about 7 µm;
   (ii) a BET surface area in a range from about 70 to about 200 m$^2$/g;
   (iii) an oil absorption in a range from about 70 to about 120 cc/100 g; and
   (iv) a pH in a range from about 6 to about 7.8.

2. The pigment particles of claim 1, wherein the weight percentage of zirconium is in a range from about 0.3 to about 1 wt. %, based on the weight of the zirconium-containing aluminosilicate pigment particles.

3. The pigment particles of claim 1, wherein the zirconium-containing aluminosilicate pigment particles comprise zirconium-containing sodium aluminosilicate pigment particles, and the alkali metal aluminosilicate particles comprise sodium aluminosilicate particles.

4. The pigment particles of claim 3, wherein the zirconium-containing sodium aluminosilicate pigment particles have an average particle size in a range from about 3 to about 6 µm.

5. The pigment particles of claim 3, wherein the zirconium-containing sodium aluminosilicate pigment particles have a pH in a range from about 6.2 to about 7.6.

6. The pigment particles of claim 3, wherein the weight percentage of zirconium is in a range from about 0.2 to about 1 wt. %, based on the weight of the zirconium-containing sodium aluminosilicate pigment particles.

7. The pigment particles of claim 3, wherein the sodium aluminosilicate particles have an oil absorption in a range from about 60 to about 120 cc/100g.

8. The pigment particles of claim 3, wherein the weight percentage of zirconium is in a range from about 0.2 to about 1 wt. %, based on the weight of the zirconium-containing sodium aluminosilicate pigment particles; and
   wherein the sodium aluminosilicate particles are characterized by:
   (i) an average particle size in a range from about 3 to about 6 µm;
   (ii) a BET surface area in a range from about 75 to about 200 m$^2$/g;
   (iii) an oil absorption in a range from about 60 to about 120 cc/100 g; and
   (iv) a pH in a range from about 6.2 to about 7.8.

9. The pigment particles of claim 1, wherein the zirconium-containing aluminosilicate pigment particles comprise zirconium-containing sodium magnesium aluminosilicate pigment particles, and the alkaline earth metal-modified alkali metal aluminosilicate particles comprise sodium magnesium aluminosilicate particles.

10. The pigment particles of claim 9, wherein the weight percentage of zirconium is in a range from about 0.2 to about 1 wt. %, based on the weight of the zirconium-containing sodium magnesium aluminosilicate pigment particles; and
    wherein the sodium magnesium aluminosilicate particles are characterized by:

(i) an average particle size in a range from about 3 to about 6 μm;
(ii) a BET surface area in a range from about 75 to about 200 m²/g;
(iii) an oil absorption in a range from about 60 to about 120 cc/100 g; and
(iv) a pH in a range from about 6.2 to about 7.8.

11. A process to produce zirconium-containing aluminosilicate pigment particles, the process comprising:
contacting an aqueous slurry of alkali metal aluminosilicate particles and/or alkaline earth metal-modified alkali metal aluminosilicate particles with at least one of zirconium sulfate and zirconium oxysulfate under conditions sufficient for a zirconium compound to at least partially coat the alkali metal aluminosilicate particles and/or alkaline earth metal-modified alkali metal aluminosilicate particles;
wherein the weight percentage of zirconium is in a range from about 0.1 to about 2 wt. %, based on the weight of the zirconium-containing aluminosilicate pigment particles; and
wherein the zirconium-containing aluminosilicate pigment particles are characterized by:
(i) an average particle size in a range from about 3 to about 7 μm;
(ii) a BET surface area in a range from about 70 to about 200 m²/g;
(iii) an oil absorption in a range from about 70 to about 120 cc/100 g; and
(iv) a pH in a range from about 6 to about 7.8.

12. The process of claim 11, wherein:
the zirconium-containing aluminosilicate pigment particles comprise zirconium-containing sodium aluminosilicate pigment particles;
the alkali metal aluminosilicate particles comprise sodium aluminosilicate particles; and
the aqueous slurry is contacted with zirconium oxysulfate (ZrOSO₄).

13. The process of claim 12, wherein the sodium aluminosilicate particles are characterized by:
(a) an average particle size in a range from about 3 to about 6 μm;
(b) a BET surface area in a range from about 75 to about 200 m²/g;
(c) an oil absorption in a range from about 60 to about 120 cc/100 g; and
(d) a pH in a range from about 6.2 to about 7.8.

14. A paint or coating composition comprising:
a binder, a liquid, and zirconium-containing aluminosilicate pigment particles comprising:
at least a partial coating of a zirconium compound on the surface of alkali metal aluminosilicate particles and/or alkaline earth metal-modified alkali metal aluminosilicate particles, wherein the weight percentage of zirconium is in a range from about 0.1 to about 2 wt. %, based on the weight of the zirconium-containing aluminosilicate pigment particles; and
wherein the zirconium-containing aluminosilicate pigment particles are characterized by:
(i) an average particle size in a range from about 3 to about 7 μm;
(ii) a BET surface area in a range from about 70 to about 200 m²/g;
(iii) an oil absorption in a range from about 70 to about 120 cc/100g; and
(iv) a pH in a range from about 6 to about 7.8.

15. A paint or coating produced from the composition of claim 14.

16. The composition of claim 14, wherein the zirconium-containing aluminosilicate pigment particles comprise zirconium-containing sodium aluminosilicate pigment particles, and the alkali metal aluminosilicate particles comprise sodium aluminosilicate particles.

17. The composition of claim 16, wherein:
the weight percentage of zirconium is in a range from about 0.3 to about 1 wt. %, based on the weight of the zirconium-containing sodium aluminosilicate pigment particles; and
the zirconium-containing sodium aluminosilicate pigment particles have an average particle size in a range from about 3 to about 6 μm.

18. The composition of claim 16, wherein the weight percentage of zirconium is in a range from about 0.2 to about 1 wt. %, based on the weight of the zirconium-containing sodium aluminosilicate pigment particles; and
wherein the sodium aluminosilicate particles are characterized by:
(i) an average particle size in a range from about 3 to about 6 μm;
(ii) a BET surface area in a range from about 75 to about 200 m²/g;
(iii) an oil absorption in a range from about 60 to about 120 cc/100 g; and
(iv) a pH in a range from about 6.2 to about 7.8.

19. The composition of claim 16, wherein the paint or coating composition further comprises an additive selected from a catalyst, a thickener, a plasticizer, a filler, a fiber, a colorant, a dispersing agent, a flow modifier, a surface modifier, an antioxidant or stabilizer, or combinations thereof.

20. A paint or coating produced from the composition of claim 19.

21. An article of manufacture comprising a substrate at least partially covered with the paint or coating of claim 20, wherein the substrate comprises metal, concrete, wood, paper, plastic, or combinations thereof.

* * * * *